United States Patent [19]

Price

[11] Patent Number: 4,895,206

[45] Date of Patent: Jan. 23, 1990

[54] PULSED IN SITU EXOTHERMIC SHOCK WAVE AND RETORTING PROCESS FOR HYDROCARBON RECOVERY AND DETOXIFICATION OF SELECTED WASTES

[76] Inventor: Ernest H. Price, 1266 Pepper Dr., El Centro, Calif. 92243

[21] Appl. No.: 324,398

[22] Filed: Mar. 16, 1989

[51] Int. Cl.⁴ .................... E21B 43/27; E21B 43/243
[52] U.S. Cl. .................................. 166/260; 166/270; 166/300; 166/307; 166/259
[58] Field of Search ............... 166/259, 260, 270, 271, 166/300, 307

[56] References Cited

U.S. PATENT DOCUMENTS

| | | | |
|---|---|---|---|
| 3,219,108 | 11/1965 | Monroe | 166/11 |
| 3,316,964 | 5/1967 | Gergini et al. | 166/288 |
| 3,327,782 | 6/1967 | Hujsak | 166/261 |
| 3,379,249 | 4/1968 | Gilchrist et al. | 166/270 |
| 3,774,682 | 11/1973 | Bousaid et al. | 166/260 |
| 4,241,790 | 12/1980 | Magnie | 166/260 |
| 4,304,298 | 12/1981 | Sutton | 166/300 X |
| 4,380,265 | 4/1983 | Mohaupt | 166/250 |
| 4,491,179 | 1/1985 | Pirson et al. | 166/257 |
| 4,552,216 | 11/1985 | Wilson | 166/261 |

*Primary Examiner*—Stephen J. Novosad
*Attorney, Agent, or Firm*—Dennis T. Griggs

[57] ABSTRACT

An active combustion zone is established in situ within a permeable hydrocarbon formation. The permeable formation is periodically charged with a combustible gas, and is thereafter subjected to a high pressure pulse produced by detonation of the combustible gas within an injection well. The periodic pressure pulses drive the combustible gas into the in situ combustion zone. Combustion is sustained by injection of an oxidant. The injection of oxidant is terminated periodically, and the injection well along with the surrounding formation is pressurized and saturated with the combustible gas mixture. The combustible gas mixture is displaced through the permeable formation in advance of the combustion flame front in response to a high pressure pulse produced by detonation of the pressurized combustible gas within the injection well. In the preferred embodiment, the combustible injection gas is a mixture of hydrogen gas and chlorine gas. As the hydrogen/chlorine gas mixture undergoes combustion, a large volume of high pressure, high temperature hydrogen chloride gas is produced, together with an aqueous solution of hydrochloric acid. The hydrochloric acid is forced into the surrounding permeable formation, and reacts with the carbonaceous materials to separate nitrogenous, sulphurous and arsenic compounds from the liquid oil product, by precipitation during distillation.

4 Claims, 5 Drawing Sheets

PULSED IN SITU EXOTHERMIC SHOCK WAVE AND RETORTING PROCESS FOR HYDROCARBON RECOVERY AND DETOXIFICATION OF SELECTED WASTES

FIELD OF THE INVENTION

This invention relates to the use of pulsed in situ exothermic shock waves for (a) the recovery of hydrocarbons from deep carbonaceous formations, and in particular to secondary recovery of petroleum products by in situ retorting of hydrocarbon strata such as oil shale or heavy crude oils, and (b) detoxification of selected toxic waste sites.

BACKGROUND OF THE INVENTION

Heavy hydrocarbon deposits include oil sands and oil shale. Oil sand is a loose to consolidated sandstone or a porous carbonate rock, impregnted with a heavy asphaltic crude oil, too viscous to be produced by conventional methods. It is also known as tar sand or bituminous sand. Oil shale is a sedimentary rock containing solid, combustible organic matter in a mineral matrix known as marlstone. The oil in the shale is captured within kerogen, a complex organic polymer material consisting essentially of carbon, hydrogen, oxygen, sulphur and nitrogen. Kerogen is substantially insoluble, but decomposes to yield oil when heated.

Additional names given to oil shales include black shale, bituminous shale, carbonaceous shale, coaly shale, cannel shale, lignitic shale, torbanite, tasmanite, gas shale, organic shale, kerosine shale, coorongite, maharahu, kukersite, kerogen shale and algal shale. The oil content of shale (gallons per ton of rock) varies from a low-grade yielding 10 gallons per ton (about 4 percent by weight) to 26 gallons per ton (about 10 percent), medium-grade, to about 36 gallons per ton (about 14 percent) for high-grade shale.

Shale oil is produced from the organic matter (kerogen) in oil shale when the rock is heated. This heating process is known as retorting, and the rate at which oil is produced depends upon the temperature at which the shale is retorted. Retorting temperature affects the nature of the shale oil produced. Low retorting temperatures produce oils in which the parafin content is greater than the olefin contents; intermediate temperatures produce oils that are more olefinic; and high temperatures produce oils that are nearly completely aromatic, with little olefin or saturate content.

Destructive distillation occurs during primary chemical processing in which the oil shale is heated in an inert atmosphere at a temperature high enough for chemical decomposition. The principal off-products are gases containing carbon monoxide, hydrogen, hydrogen sulfide and ammonia, oils and water solutions of organic acids, alcohols and ammonium salts. Crude shale oil when subjected to destructive distillation undergoes a reduction in its viscosity and an increase in its hydrogen content. Preferably, the destructive distillation proceeds at about 400 degrees centigrade, in a range of 100-1,500 psi pressure, and preferably in an oxygen free atmosphere.

Shale oil has been recovered from carbonaceous deposits lying near the surface by mining, crushing and aboveground retorting. Recovery from deep carbonaceous formations has been accomplished by in-place processing, more commonly referred to as in situ retorting.

In situ retorting is carried out by initiating a combustion zone in the vicinity of an injection hole or well penetrating a carbonaceous formation, supplying oxygen or air to the combustion zone and permitting the combustion zone to migrate through the stratum by supplying pressurized air. By this method, the heat and products of combustion of a substantial portion of the burning carbonaceous material is forced out into contiguous portions of the stratum, sweeping or driving fluid carbonaceous materials toward a production well, thereby stimulating the production rate from the reservoir. Such practice is commonly referred to as fire flooding or thermal recovery.

DESCRIPTION OF THE PRIOR ART

A limitation on in situ processing of heavy hydrocarbons is the lack of natural permeability of the strata, making it nearly impossible to recover oil from them. The permeability of oil shale formations has been improved by conventional fracturing techniques, including electrolinking, well bore shooting, and hydraulic fracturing.

The process of pyrolyzing kerogen in oil shale to form liberated hydrocarbons can be done in surface retorts or underground in situ retorts. In the underground in situ retorts, the shale is not mined, and holes are drilled into the formation and the oil shale is explosively fractured (rubblized), and then retorted.

Ignition of the carbonaceous stratum to establish a combustion zone has been produced by an electric heater, an electric spark - ignited gas fired heater, a torch, with a flow of oxygen and fuel gas such as natural gas discharged through a nozzle onto the stratum. The fuel gas and oxygen are burned until the ignition temperature of the carbonaceous material is reached. At that point, the flow of fuel gas is terminated, with compressed air being supplied to sustain combustion.

It will be appreciated that most heavy hydrocarbon formations are suited for destructive distillation under in situ retort conditions. However, the effectiveness of conventional in situ retorting has been limited by the inability to control the extent and intensity of combustion because of the application of pressurized air or other oxidant, and the inability to control the rate of advance of the combustion zone through the carbonaceous formation.

As shale oil is heated to ignition temperature, the organic kerogen component is thermally decomposed to liberate vapors, mists, liquid droplets of shale oil and light hydrocarbon gases. It is desirable to establish and maintain a uniform temperature level within the combustion zone whereby thermal pyrolysis of the kerogen can proceed effectively while minimizing carbonate decomposition and loss of product shale oil as a result of unnecessary combustion.

Some carbonaceous formations suitable for in situ retorting and destructive distillation of shale oil contain a high level of nitrogen, sulphur and arsenic compounds. These materials should be removed since they have an adverse effect on product quality and secondary refinery processing. For example, arsenic compounds should be removed to prevent catalytic poisoning at the refinery. Presently, the removal of these compounds may be achieved by high pressure surface retorting and high hydrogen consumption, for example at a rate generally exceeding 2,000 standard cubic feet per hour. Another method utilizes fixed bed catalytic processing. Such procedures require controlled conditions and surface access which cannot be provided in deep hydrocarbon formations.

OBJECTS OF THE INVENTION

The principal object of the present invention is to provide an improved method for maintaining a controlled temperature level within an in situ exothermic zone to produce thermal pyrolysis of kerogenic materials while minimizing carbonate decomposition and loss of hydrocarbon product as a result of unnecessary combustion.

Another object of this invention is to provide a method for in situ removal of nitrogen, sulphur and arsenic compounds during the production of shale oil by in situ retorting.

Another object of this invention is to provide intermittent heat and fracturing of stratum by an exothermic reaction of hydrogen and chlorine producing hot hydrochloric gas and acid dissolved in watery solution to obtain a lighter viscosity crude more readily pumpable to the surface and transportable by pipeline or container vehicles.

Another object of this invention is to provide an improved method for producing additional fracturing, thermal and hydrochloric acid treatment of a hydrocarbon stratum by automatic control over selected time intervals followed by pumping from the same well. This is helpful in the hydrocarbon well where "coning" of deposits or stratum at the downhole bore entry has slowed or cut off production.

Another object of this invention is to provide a method of in situ detoxification of shallow or deeply buried toxic chemical waste sites as often evidenced by contaminated ground water levels, or for meeting certain standards for new building sites.

Another object of this invention is to produce periodic pressure pulses for seismic analysis to locate untapped reserves.

SUMMARY OF THE INVENTION

The foregoing objects are achieved according to one aspect of the present invention by penetrating a permeable, carbonaceous formation by an injection well, pressurizing the injection well and penetrating the permeable formation in a surrounding region with a combustible gas, detonating the pressurized combustible gas within the well to produce combustion of carbonaceous materials in the region surrounding the well, and pressurizing the surrounding formation with an oxidant to maintain in situ combustion. After an active combustion zone has been established, the permeable formation is periodically charged with the combustible gas, and is thereafter subjected to a high temperature, high pressure pulse produced by detonation of the combustible gas within the well. The periodic pressure pulses drive the combustible gas into the active combustion zone of the permeable formation.

The rate at which the combustion zone propagates through the permeable formation is controlled by the magnitude of the thermal energy released by the periodic, explosive detonations, by the magnitude of the pressure pulse developed in response to the periodic detonations, and by the frequency of the detonations. The in situ retort temperature is maintained substantially within a desired pyrolysis range throughout the active reaction zone by periodically terminating the injection of oxidant into the well, charging the permeable formation with the combustible gas, and thereafter detonating the pressurized combustible gas within the well to produce a high pressure pulse which causes the combustible gas to penetrate further into the permeable formation.

According to a preferred aspect of the method, pressurized hydrogen gas and chlorine gas are injected into the well until a localized region of the permeable hydrocarbon formation is saturated. The pressurized hydrogen gas/chlorine gas mixture is explosively detonated by discharging a high voltage electric arc inside of the pressurized well. The explosive detonation of the hydrogen gas/chlorine gas mixture produces a large pressure pulse which drives the hydrogen gas/chlorine gas mixture through the surrounding permeable formation. As the mixture of chlorine/hydrogen gas undergoes combustion, a large volume of high pressure, high temperature hydrogen chloride gas is produced, together with an aqueous solution of hydrochloric acid. The hydrochloric acid is forced into the surrounding permeable formation, and reacts with the carbonaceous materials to precipitate nitrogenous, sulphurous and arsenic compounds as basic amines and insoluble amine salts, and splits any heavy hydrocarbons into free flowing viscosities.

Other features and advantages of the present invention will be appreciated by those skilled in the art upon reading the detailed description which follows with reference to the attached drawings.

DETAILED DESCRIPTION OF THE PREFERRED EMBODIMENTS

In the description which follows, like parts are indicated throughout the specification and drawings with the same reference numerals, respectively.

Figure 1:
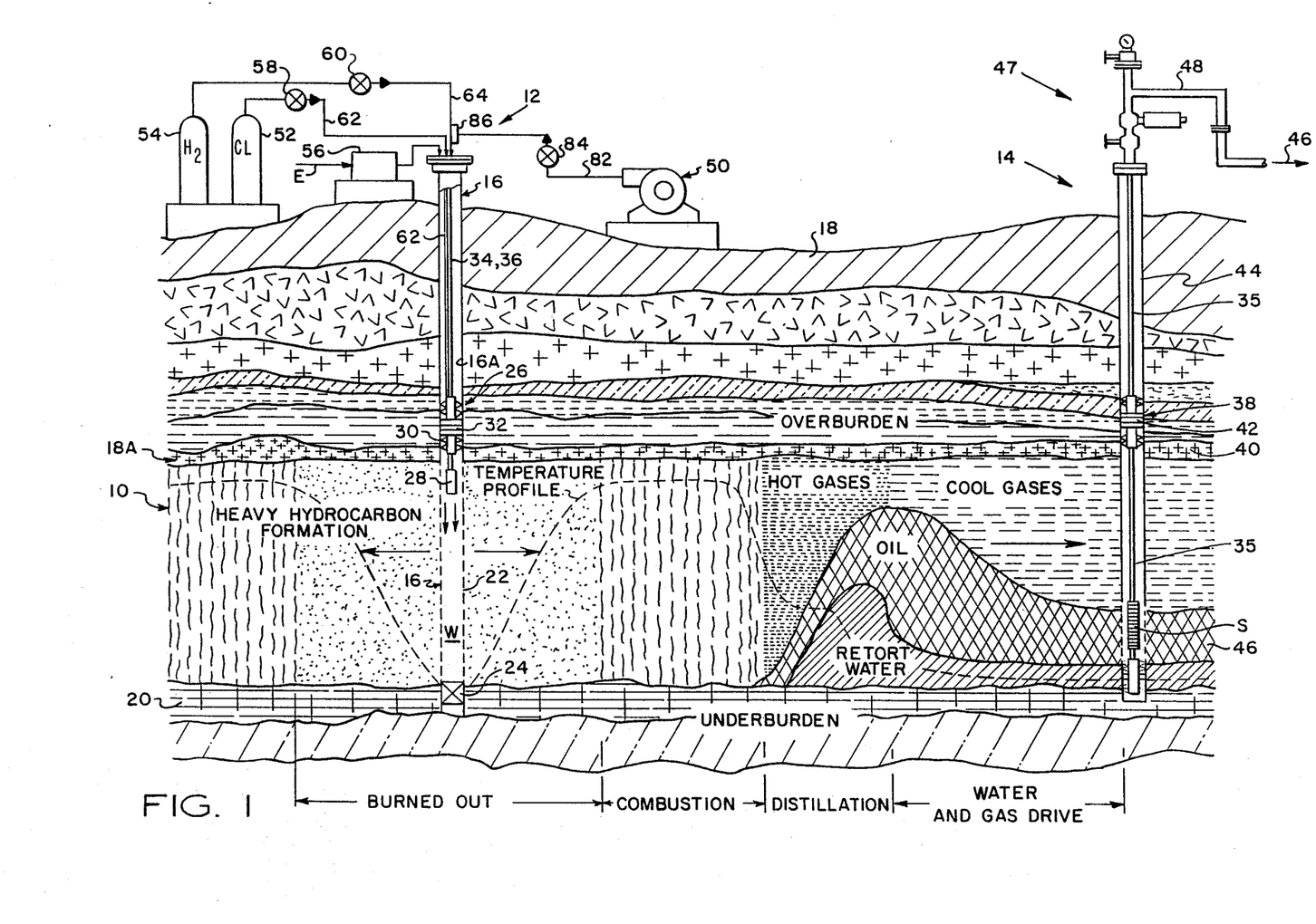
FIG. 1 is a simplified schematic diagram showing a vertical section through a heavy hydrocarbon formation which is intersected by an injection well and by a production well, with the heavy hydrocarbon formation undergoing in situ retorting according to method of the present invention.

Referring now to FIG. 1, a heavy hydrocarbon formation 10 is intersected by an injection well 12 and a production well 14. A tubular string of casing 16 extends through multiple layers of overburden 18, traversing the heavy hydrocarbon formation 10, and intersects one or more layers of underburden 20. The tubular casing sections which intersect the heavy hydrocarbon formation 10 are perforated by multiple openings 22 formed through the casing sidewall to permit injection of fluids from a well W into the adjoining hydrocarbon bearing formation 10. The well W is sealed by a bottom packer 24 which is installed in sealed engagement against the inside bore of the well casing 22, preferably at an elevation below the heavy hydrocarbon formation 10.

The heavy hydrocarbon formation 10 is confined vertically between the overburden layers 18 and an underburden layer 20, typically of an impervious siltstone or other barren rock. The method of the invention is most readily adapted to a generally horizontally aligned heavy hydrocarbon formation 10, as illustrated, having a thickness from 20 feet to 500 feet. For illustrative purposes, the hydrocarbon formation 10 is described at a depth of 7,500 feet, with a reservoir pressure of 2,000 psi and a reservoir temperature of 130° F. The overburden layer 18A and subjacent underburden layer 20 are impervious to the flow of gas. The heavy hydrocarbon formation 10 in this example is an oil shale deposit having a shale oil content of from about 26 gallons per ton to about 30 gallons per ton. The crude shale oil has a pour point of 65°–90° F. and a gravity of 21-24 degrees API at 60° F. The reservoir stratum has an average porosity of 25 percent and the kerogen saturation is 85 percent of pore volume.

Figures 2, 3, 4, 5:
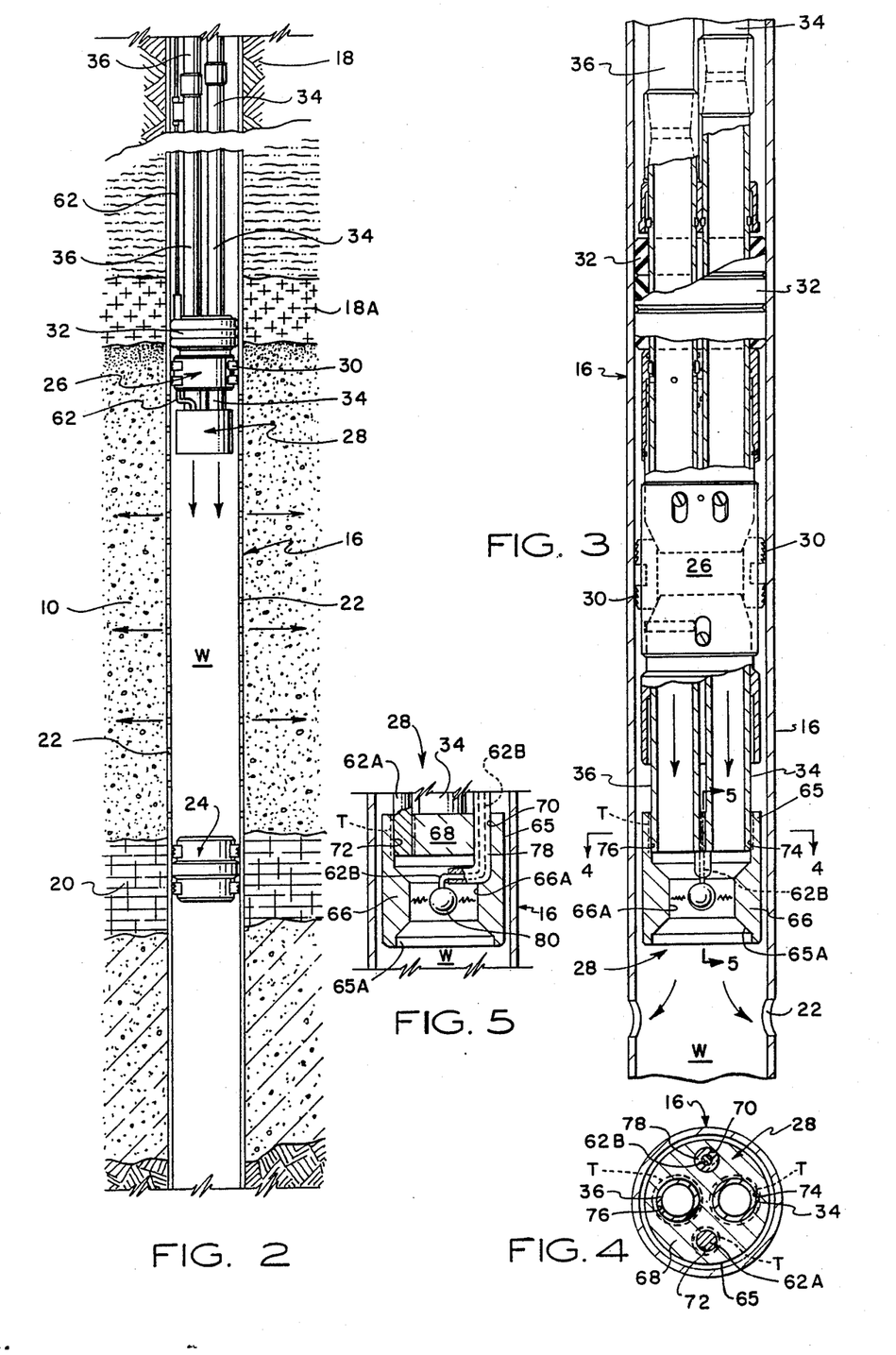
FIG. 2 is a simplified sectional view which illustrates structural details of the injection well.
FIG. 3 is a longitudinal half section view of the dual packer and ignitor assembly shown in FIG. 2.
FIG. 4 is a sectional view taken along the lines 4—4 of FIG. 3.
FIG. 5 is a sectional view of the ignition apparatus taken along 5—5 of FIG. 3.

The injection well 16 is completed by the installation of a service packer 26 which is releasably anchored at an elevation above the heavy hydrocarbon formation 10. The service packer 26 supports an ignitor 28 within the perforated casing 16. The service packer 26 includes anchor slips 30 and an annular, elastomeric seal 32. The anchor slips 30 releasably secure the service packer 26 to the tubular casing bore 16A, and the elastomeric seal 32 produces a fluid seal in the annulus between the packer and the casing bore 16A.

The service packer 26 is provided with dual flow passages. Dual injection tubing strings 34, 36 are extended from the surface to the service packer 26 for delivering pressurized gas agents to the dual flow passages of the service packer 26.

In the preferred embodiment, the exothermic reaction gases are hydrogen and chlorine, and are conducted through the dual injection tubing strings 34, 36 through the packer 26 and through the ignitor assembly 28, where the pressurized gases are discharged into the well chamber W and flow outwardly into the heavy hydrocarbon formation 10. Preferably, ignition is accomplished by a high intensity electrical discharge arc through ignitor 28. However, other ignitor means such as ultrasonic compression of the gas mixture may be used to initiate the exothermic reaction. In the ultrasonic compression ignitor shown in FIG. 8, electrical stimulation of a piezoelectric crystal produces a compression wave within the mixture of hydrogen and chlorine gases. The ultrasonic compression waves elevate the temperature of the gases to nearly 5,000° F., thereby initiating an exothermic reaction of the gases.

One or more production wells 14 are completed at laterally spaced locations for producing shale oil recovered by pyrolysis of carbonaceous materials within the formation. The well 14 serves as a pressure relief well and as a producer well.

For that purpose, the production well 14 is completed with a tubular screen S which is supported by a tubular production conduit 35 suspended from a production packer 38. The production packer 38 includes anchor slips 40 and an elastomeric seal 42 which releasably secure the packer against the bore of a tubular well casing 44. Shale oil produced through the production tubing 36 flows to the surface to a wellhead assembly 46. The wellhead assembly supports the upper end of the production tubing 36 and seals the casing 44. Shale oil product 46 is conveyed to a surface reservoir through a flow line 48.

If the pressure of the formation 10 is not sufficient to drive the oil to the surface naturally, a downhole pump and pump jack are used for producing the shale oil to the surface.

In preparation for carrying out the pulsed in situ retorting of carbonaceous materials within the heavy hydrocarbon formation 10, the injection well 16 is provided with an air compressor 50, a tank 52 of high pressure chlorine gas, and a tank 54 of pressurized hydrogen gas. Additionally, a high voltage, high energy accumulator 56 produces a high voltage electric charge from an external power source E for delivery to the ignitor 28.

The chlorine tank 52 and hydrogen tank 54 are separately coupled to the injection conduits 34, 36, respectively, through check valves 58, 60 and flow lines 62, 64, respectively. The high voltage accumulator 56 is electrically coupled to the ignitor 28 by a two conductor electrical cable 62.

The heavy hydrocarbon formation 10 is prepared for treatment by opening flow valves 58, 60 to inject hydrogen gas and chlorine gas into the well W at an elevated pressure, for example 3,000 psi. Pressurized hydrogen gas and chlorine gas are conducted through injection conduits 34, 36 into the ignitor 28. The ignitor 28 discharges the pressurized gas into the well W and through the perforated well casing 16. The mixture of hydrogen and chlorine gas propogates outwardly through the formation 10 and saturates a region surrounding the perforated well casing After a desired pressure level is established within the well W, and saturation of a local region surrounding the well has been completed, hydrogen and chlorine gas injection is terminated and the check valves 58, 60 are closed, thereby isolating the gas sources 52, 54 from the well W. The ignitor 28 is then energized by the conduction of a high energy, high voltage electrical pulse through power conductors 62A, 62B as illustrated in FIGS. 2, 3, 4 and 5.

Referring now to FIGS. 4 and 5, the ignitor 28 includes a tubular mandrel 65 which is attached to the lower end portions of the gas conduits 34, 36 by a threaded union T. The mandrel 65 has a radially projecting, annular shoulder 66, which constitutes an annular electrode. The mandrel 65 includes an integrally formed blocker plate 68. As can best be seen in FIG. 4, two small bores 70, 72 and two larger bores 74, 76 extend axially through the blocker plate 68 for receiving the power conductors and the gas conduits, respectively.

Power conductor 62A is electrically and mechanically joined to the blocker plate 68 by a threaded union T, and is thus electrically connected to the outer electrode 66. The second electrical conductor 62B is routed through the bore 70, and is insulated from the blocker plate 68 by a ceramic sleeve 78. The power conductor 62B is terminated by a conductive ball 80 which is suspended within the bore 66A of the annular electrode 66. The conductive ball 88 is radially spaced from the annular electrode 66, so that a heavy electric arc will be propagated across the annular gap between the conductive ball 80 and the annular electrode 66 in response to a high energy electrical pulse delivered from the accumulator 56 through the power conductors 62A, 62B.

The mandrel bore 65A together with the annular electrode bore 66A constitute a detonation chamber which opens in communication with the well W. On ignition, the pressurized mixture of hydrogen and chlorine gas within the well W react explosively when detonated by the electrical arc to form hydrogen chloride gas. The hydrogen chloride gas thus formed is at a high temperature and pressure level and is thereby forced through the casing perforations 22 into the surrounding formation 10.

On ignition, the combustible mixture undergoes rapid burning and heating, and rapidly expands, with the result that high pressure flame jets of burning gas are emitted through the perforations 22, thereby igniting the surrounding hydrocarbons along with hydrogen and chlorine gas previously discharged into the surrounding permeable formation. During detonation and initial combustion, the temperature within the well and in the formation immediately surrounding the well rises to approximately 1,200° F., and the pressure pulse generated inside the well is on the order of about 10 times the formation pressure prior to ignition. The pressure pulse is dissipated as the flames and combustion products are emitted into and absorbed by the surrounding permeable formation 10.

Figure 9:
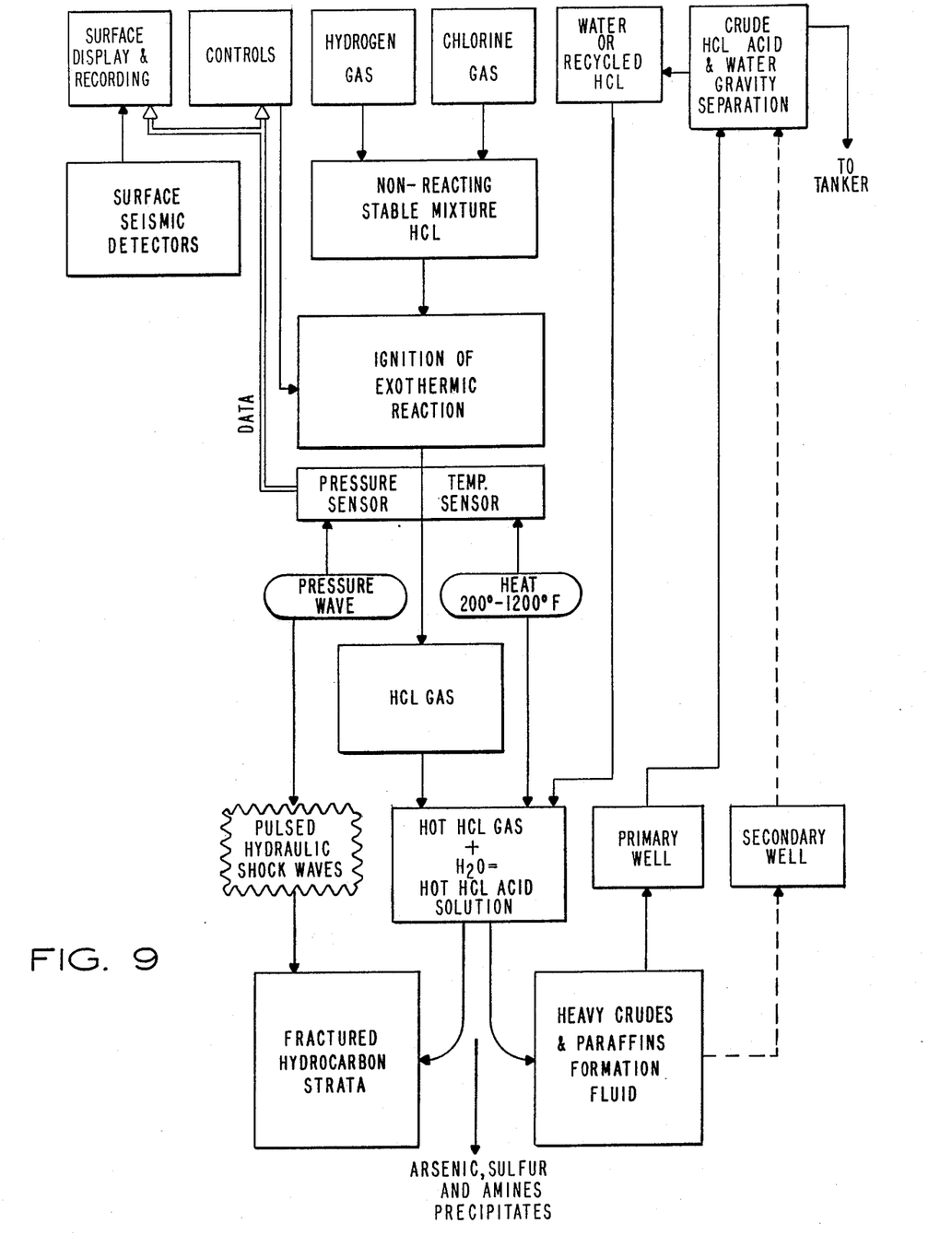
FIG. 9 is a block diagram which illustrates management of the pulsed in situ exothermic reaction; and, FIG. 10 is a simplified schematic diagram showing a vertical section through a toxic waste dump, with detoxification of selected wastes being accomplished by pulsed in situ exothermic shock wave and retorting.

It may be necessary to repeat the initial charging of the formation 10 and detonation one or more times until the hydrocarbon bearing formation around the well bore is undergoing in situ combustion. The temperature in this part of the formation will be in the range of 600° F.–1,200° F. Thereafter, the valves 57, 60 are closed, and the compressor valve 84 is opened to admit pressurized oxidant into the well bore to sustain combustion. Downhole pressure and temperature data are sensed and communicated to the surface for control purposes, as indicated by FIG. 9.

Upon dissipation of the pressure pulse, an oxidant such as pressurized air is injected into the well W by the compressor 50. The air compressor 50 is connected by a conduit 82 through a check valve 84 for delivery of compressed air into conduit 34 through a T coupling 86. Compressed air, or other oxidant such as oxygen mixed with air, is discharged into the well W to sustain combustion.

Because the surrounding formation is saturated with hydrogen and chlorine, an exothermic reaction can be sustained over a wide range of oxidant flow conditions. For example, hydrogen has a wide limit of flammability, and thus has the capability for sustaining combustion. Hydrogen is also an excellent fuel having a high heat value of about 60,000 BTU per pound compared to petroleum components which have a heat value on the order of 20,000 BTU per pound. Thus, the oxidant quality is not critical, and compressed air can be used to good advantage to sustain combustion. The rate at which compressed air is discharged into the well is dependent upon the permeability of the heavy hydrocarbon formation 10 and the desired rate of propagation of the flame front through the exothermic reaction zone.

In most formations, a combustion zone temperature of 600° F.–1,200° F. is sufficient to pyrolyze the kerogen to yield shale oil at a viscosity sufficiently mobile to be displaced through the reservoir toward the production well. Since the rate of combustion may become too great, it may be necessary to provide a supply of steam to supplement the sweeping action of the air and also to dampen the combustion and maintain a desired combustion rate. It is expected that the amount of oxidant injected will vary between 25 and 2,000 standard cubic feet per reservoir barrel traversed by the burn front and that the injection pressure will be below the gas fracturing pressure of the reservoir in its original state.

Referring again to FIG. 1, the compressed oxidant feed gas (compressed air) sustains and drives the reaction front through an annular region surrounding the well W. A burned out region is produced as the flame front advances. According to the method of the invention, a localized region of the formation has been previously saturated with hydrogen and chlorine gas, with the result that substantially uniform combustion occurs in the saturated region immediately surrounding the reaction zone, as indicated by the temperature profile.

The thermal front within the combustion zone emits heat which pyrolyzes the kerogen hydrocarbons within the formation 10. The hydrocarbons are liberated as light gases such as methane, ethane, ethene, propane and propene, along with liquid shale oil which flows laterally outwardly toward the production well 14 in response to the pressure of hot gases and retort formation fluids. A large quantity of retort off gases including hydrogen, carbon monoxide, carbon dioxide, ammonia, nitrogen, water vapors and low molecular weight hydrocarbon vapors, which drive the shale oil 46 toward the production well 14. The shale oil 46 is produced through the screen S and production conduit 35.

Destructive distillation occurs in the hot gas zone immediately adjacent the active combustion zone. According to a preferred method of the invention, the combustion zone and the distillation zones are previously saturated with a combustible mixture of chlorine/hydrogen gas. As the chlorine/hydrogen gas mixture undergoes combustion, a large volume of high pressure, high temperature hydrogen chloride gas is produced, together with an aqueous solution of hydrochloric acid. The hydrochloric acid reacts with the carbonaceous materials within the formation to precipitate nitrogenous, sulphurous and arsenic compounds as basic amines and insoluble amine salts. Thus, these unwanted compounds are separated from the shale oil by precipitation and accumulate within the body of retort water, thereby reducing the amount of secondary processing which the shale oil 46 must undergo at the surface for upgrading the quality of the shale oil product.

It is desirable to establish and maintain a uniform retorting temperature level within the active combustion zone whereby thermal pyrolysis of the kerogen hydrocarbons can proceed effectively with the production of oils having a desired olefin content while minimizing carbonate decomposition and loss of product shale oil as a result of unnecessary combustion. The in situ retort temperature is regulated and maintained substantially within a desired pyrolysis range throughout the active combustion zone by periodically terminating the injection of oxidant into the well, charging a localized region of the permeable formation with a combustible gas mixture, such as hydrogen and chlorine gas, until the localized region is saturated, and then detonating the pressurized combustible gas within the well to produce combustion of the carbonaceous materials within the localized region. After an active combustion zone has been established, the permeable formation is periodically charged with the combustible gas, and is thereafter subjected to a high pressure pulse produced by detonation of the combustible gas within the well. The periodic pressure pulses renew the saturation of the formation as the combustion zone advances toward the production well.

Localized regions within the permeable formation exhibit a sponge effect and are capable of sustaining localized pressurization with the result that the hydrogen and chlorine gas mixture can be retained temporarily within a localized region lying within the propagation path of the combustion flame front. The saturation charge of hydrogen and chlorine gas is renewed within the formation from time-to-time, depending upon the rate of advance of the combustion flame front. Because of the low specific gravity and high diffusion rates of hydrogen and chlorine gas, a predictable localized zone within the permeable formation can be saturated with the hydrogen and chlorine gas in response to the periodic pressure pulses. The hydrogen gas and chlorine gas are thus distributed substantially uniformly throughout a localized zone of the formation lying adjacent to the interface of the combustion flame front, thereby promoting uniform combustion throughout the active combustion zone.

By periodically recharging the active regions of the formation surrounding the injection well with the combustible gas mixture, incompletely burned hydrocarbon materials within the burned out zone are re-ignited, thereby enhancing production. By saturating the permeable formation with the combustible gas mixture, a substantially uniform retort temperature can be established across the combustion zone. The presence of hydrogen and chlorine gas at saturation levels within the permeable formation reduces the amount of oxidant required to sustain combustion, thereby effectively eliminating the excess use of oxygen which could cause increased retort temperatures, while minimizing carbonate decomposition and loss of product shale oil as a result of unnecessary combustion.

Figures 6, 7, 8:
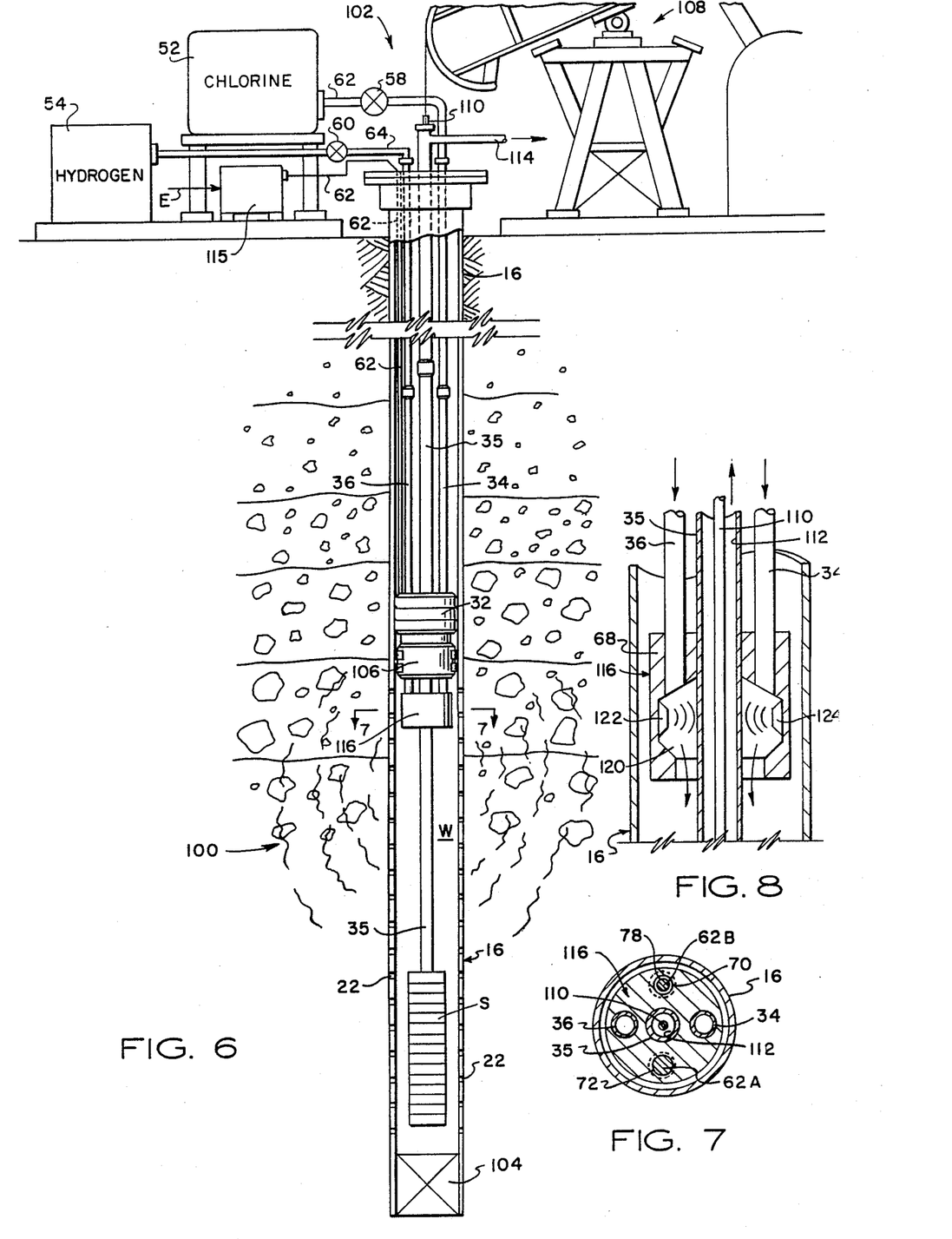
FIG. 6 is a simplified sectional view which illustrates structural details of a combination injection and production well.
FIG. 7 is a sectional view of the ignition apparatus taken along lines 7—7 of FIG. 6.
FIG. 8 is a longitudinal half section view of the ignition a shown in FIG. 6.

Referring now to FIG. 6, a permeable producing formation 100 is intersected by a combination injection and production well 102. A tubular string of casing 16 extends through multiple layers of overburden, and traverses the hydrocarbon formation 100. The tubular casing sections which intersect the permeable hydrocarbon formation 10 are perforated by multiple openings 22 formed through the casing sidewall 16 to permit the flow of fluids between the well W and the adjoining permeable hydrocarbon bearing formation 10. The well W is sealed by a bottom plug 104, preferably at an elevation below the permeable hydrocarbon formation 100.

A screen S is supported within the wall W above the bottom plug 104. The production conduit 35 and screen S are suspended from a packer 106 which is provided with triple flow passages as shown in FIGS. 7 and 8. Dual injection tubing strings 34, 36 are extended from the surface to the service packer 106 for delivering separate pressurized hydrogen and chlorine gas from the high pressure containers 52, 54. A pump jack 108 reciprocates a sucker rod 110 within production tubing 35, and the sucker rod drives a pump mounted within the screen S. According to this arrangement, formation fluid is pumped through the production bore 112 to the surface where it is delivered through a flow conduit 114. A high frequency power supply 115 is connected through conductor cable 62 for delivering a high frequency signal to the ultrasonic ignitor 116.

The combination injection and production well 102 is thus adapted for intermittent production, with production being interrupted from time-to-time to permit the formation 100 to be subjected to pulsed in situ exothermic shock waves. This produces fracturing of the formation, and the propagation of hydrochloric acid through the producing stratum, with the thermal energy and acid products further reducing the viscosity of the formation hydrocarbons.

The permeable hydrocarbon formation 100 is prepared for treatment by first injecting pressurized water through the well and into the surrounding formation 100. After an initial hydraulic fracturing has been produced, the flow valves 58, 60 are opened to inject hydrogen gas and chlorine gas into the well at an elevated pressure, for example 3,000 psi. Pressurized hydrogen gas and chlorine gas are conducted through the injection conduits 34, 36 and through the ignitor 116. The ignitor 116 discharges the pressurized gases into the well and through the perforated well casing 16. The mixture of hydrogen and chlorine gas propagates outwardly through the formation 100 and saturates a localized region surrounding the perforated well casing.

After a desired fluid gas pressure level has been established within the well W, the hydrogen and chlorine gas injection is terminated and the check valves 58, 60 are closed, thereby isolating the gas sources 52, 54 from the well W. The ignitor 116 is then energized by the conduction of a high frequency electrical pulse signal through the power conductors 62A, 62B.

In the ignitor 116, ignition of the hydrogen and chlorine gas mixture is produced by ultrasonic compression of the gas mixture within a compression chamber 120. The conduits 34, 36 open into the compression chamber 120, and a pair of piezoelectric transducers 122, 124 are mounted within the compression chamber 120. The piezoelectric transducers 122, 124 produce an ultrasonic compression wave in response to a high frequency electrical pulse excitation signal applied through the power conductor 62A, 62B from the power supply 115. Ultrasonic compression waves elevate the temperature of the gas mixture to nearly 5,000° F. to initiate the exothermic reaction.

On ignition, the pressurized mixture of hydrogen and chlorine gas within the well W reacts explosively when detonated by the electrical arc to form hydrogen chloride gas. The hydrogen chloride gas thus formed is at a high temperature and pressure level and is discharged through the casing perforations 22 into the surrounding formation 100. The ignited mixture undergoes rapid heating, and rapidly expands, with the result that a high pressure jet of exploding gas is emitted through the perforations 22. During detonation and the initial exothermic reaction, the temperature within the well and in the formation immediately surrounding the well rises to approximately 1,200° F., and the pressure pulse generated inside the well is on the order of about 10 times the formation pressure prior to ignition. The pressure pulse is dissipated and as the heat and chemical reaction products are emitted into and absorbed by the surrounding permeable formation 100, including the water solution principally composed of hydrochloric acid.

It may be necessary to repeat the detonation and pressure pulse one or more times until the producing formation around the well bore is heated sufficiently to remove wax deposits and otherwise clear the formation, especially for formations where coning of deposits has slowed or cut off production. Downhole conditions are monitored by pressure and temperature sensors, and the output from primary and secondary wells is monitored so that formation conditions can be evaluated as indicated in FIG. 9. The application of the in situ exothermic shock wave can be selected on the basis of actual formation conditions thereby maximizing production or boosting production in a marginal situation. Surface seismic detectors, as shown in FIG. 9, are installed throughout the field overlying the producing formation and transmit seismic data to a surface display and recording station so that the producing formation can be evaluated each time a detonation occurs.

Figure 10:
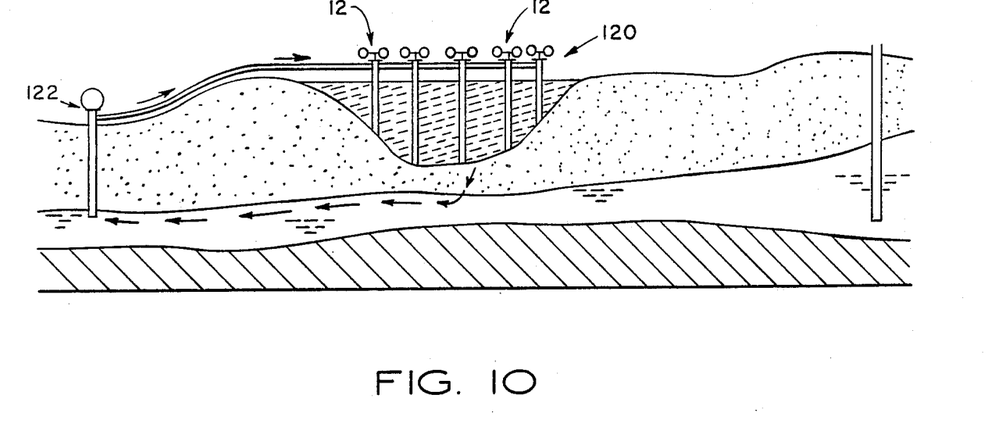

Referring now to FIG. 10, the pulsed in situ exothermic shock wave and retorting process of the invention is used for detoxification of a waste dump 120. The toxic dump 120 is penetrated by two or more injection wells 12, substantially as shown in FIG. 1. In this arrangement, each well is pressurized with a mixture of hydrogen and chlorine gas until a localized region of the waste dump is saturated. The pressurized hydrogen gas/chlorine gas mixture is explosively detonated by discharging a high voltage arc inside of the pressurized well, as previously discussed. The explosive detonation of the hydrogen gas/chlorine gas mixture produces a large pressure pulse which drives the hydrogen gas/chlorine gas mixture through the surrounding materials. The retort water, including the aqueous solution of hydrochloric acid, is pumped from a nearby well 122, with the contaminated water being recycled through the injection wells until the contamination has been cleared.

Although the invention has been described with reference to a specific embodiment, and with reference to a specific heavy or oil shale formation, the foregoing description is not intended to be construed in a limiting sense. Modifications of the disclosed embodiment as well as alternative applications of the invention will be suggested to persons skilled in the art by the foregoing specification and illustration. It is therefore contemplated that the appended claims will cover any such modifications or embodiments that fall within the true scope of the invention.

What is claimed is:

1. A method for recovering heavy hydrocarbon products from a permeable, carbonaceous formation comprising the steps:

penetrating said permeable carbonaceous formation by an injection well;

pressurizing the injection well and penetrating the permeable formation in a localized region with a combustible gas;

detonating the pressurized combustible gas within the well to produce combustion of carbonaceous materials in a region surrounding the well;

pressurizing the surrounding formation with an oxidant to maintain in situ combustion;

terminating the injection of oxidant;

saturating a region of the permeable formation surrounding the injection well with pressurized combustible gas;

detonating the combustible gas within the well to produce a high pressure pulse of combustion products;

displacing the combustible gas within the saturated region of the permeable formation toward the production well in response to the pressure pulse;

injecting oxidant into the well and into the formation to sustain combustion within an active region of the permeable formation;

sweeping fluid carbonaceous materials yielded from the permeable formation in response to the heat and pressure produced by in situ combustion within the formation; and, producing the fluid carbonaceous materials through a production well.

2. The method as defined in claim 1, wherein said combustible gas mixture comprises hydrogen gas and chlorine gas.

3. A method for enhancing the recovery of hydrocarbons from a permeable formation comprising the steps of:

saturating a localized region within the formation with a mixture of hydrogen and chlorine gas;

initiating an exothermic reaction of the hydrogen and chlorine gas mixture within the saturated region to produce high temperature hydrogen chloride gas and an aqueous solution of hydrochloric acid; and, reacting the hydrochloric acid with carbonaceous materials within the formation to precipitate nitrogenous, sulphurous and arsenic compounds as basic amines and insoluble amine salts.

4. A method for stimulating the production of hydrocarbon products from a well which intersects a permeable, carbonaceous formation comprising the steps:

pressurizing the well and penetrating the permeable formation in a localized region surrounding the well with a mixture of hydrogen and chlorine gas;

initiating an exothermic reaction of the hydrogen and chlorine gas mixture within the well and in the saturated region to produce high temperature hydrogen chloride gas and an aqueous solution of hydrochloric acid; and, reacting the aqueous solution of hydrochloric acid with carbonaceous materials within the surrounding formation.

* * * * *

UNITED STATES PATENT AND TRADEMARK OFFICE
CERTIFICATE OF CORRECTION

PATENT NO. : 4,895,206

DATED : 1/23/90

INVENTOR(S) : Ernest H. Price

It is certified that error appears in the above-identified patent and that said Letters Patent is hereby corrected as shown below:

On the Title Page, in the Title:

"PULSED IN SITU EXOTHERMIC SHOCK WAVE AND RETORTING PROCESS FOR HYDROCARBON RECOVERY AND DETOXIFICATION OF SELECTED WASTES" should be -- PULSED IN SITU EXOTHERMIC SHOCK WAVE AND RETORTING PROCESS FOR HYDROCARBON RECOVERY --.

Column 1, line 20, "impregnted" should be -- impregnated --.

Column 4, line 37, "according to method" should be -- according to the method --.

Column 4, line 53, "a" should be -- apparatus --.

Column 6, line 41, "casing" should be -- casing. --.

Signed and Sealed this

Thirtieth Day of October, 1990

Attest:

HARRY F. MANBECK, JR.

*Attesting Officer*     *Commissioner of Patents and Trademarks*